United States Patent [19]

Relihan

[11] Patent Number: 4,573,183

[45] Date of Patent: Feb. 25, 1986

[54] X-RAY IMAGE BRIGHTNESS CONTROL

[75] Inventor: Gary F. Relihan, Nashotah, Wis.

[73] Assignee: General Electric Company, Schenectady, N.Y.

[21] Appl. No.: 625,918

[22] Filed: Jun. 29, 1984

[51] Int. Cl.⁴ ........................ H04N 1/38; H04N 5/32; H04N 7/18

[52] U.S. Cl. ........................................ 378/108; 378/99

[58] Field of Search .................... 378/108, 99; 358/111

[56] References Cited

U.S. PATENT DOCUMENTS 3,567,854 3/1971 Tschantz ............................ 378/108

*Primary Examiner*—Alfred E. Smith
*Assistant Examiner*—T. N. Grigsby
*Attorney, Agent, or Firm*—Fuller, House & Hohenfeldt

[57] ABSTRACT

Analog video signals representative of an X-ray image are gated to a first integrator during times in each horizontal line scan in a raster field when a window signal exists and the video signal amplitude is also above a threshold reference level for the integrator to produce a signal representative of the average brightness of the image in areas that are not excluded by their video signal being below threshold level. A second integrator integrates a constant reference voltage signal only during the time that the video signal is being integrated. Since the video scanning rate is constant, the simultaneously produced second integrator signal corresponds to the total continuous or discontinuous area or areas over which the video signal is integrated. The integrated signal representing average image brightness is divided by the signal representing area to yield a signal representing brightness per unit area. This signal is compared with a reference signal corresponding to desired image brightness and the resulting error signal so produced is used to vary the X-ray tube current regulator until the error is nulled. The brightness determination is independent of the X-ray field size set by the collimator and high X-ray attenuating objects in the X-ray beam are excluded.

4 Claims, 6 Drawing Figures

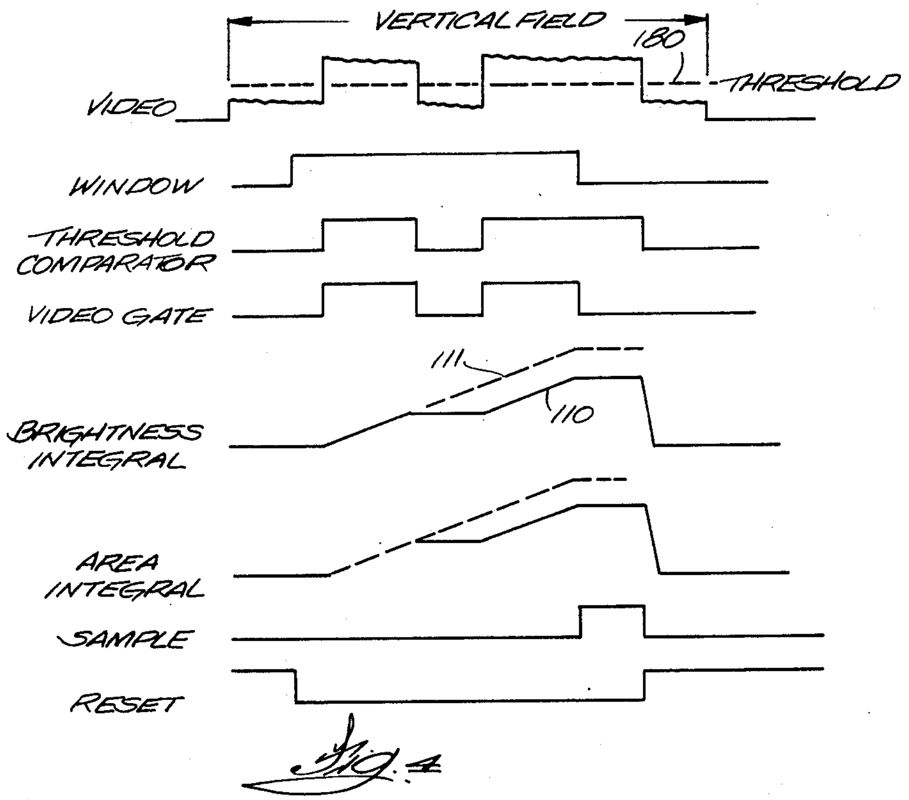
Fig. 4
Fig. 5
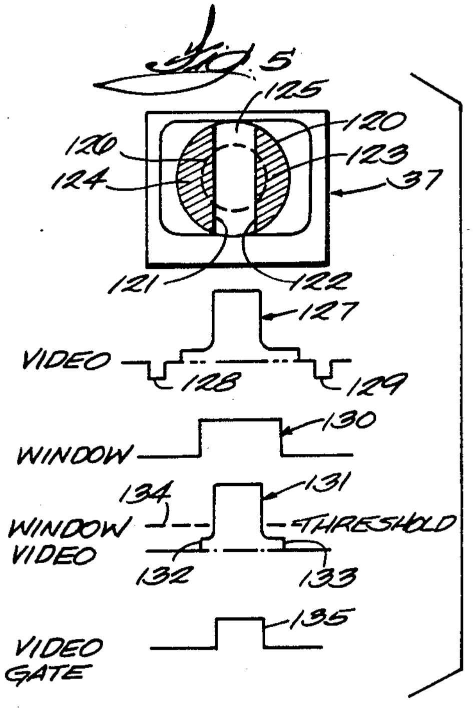
Fig. 6
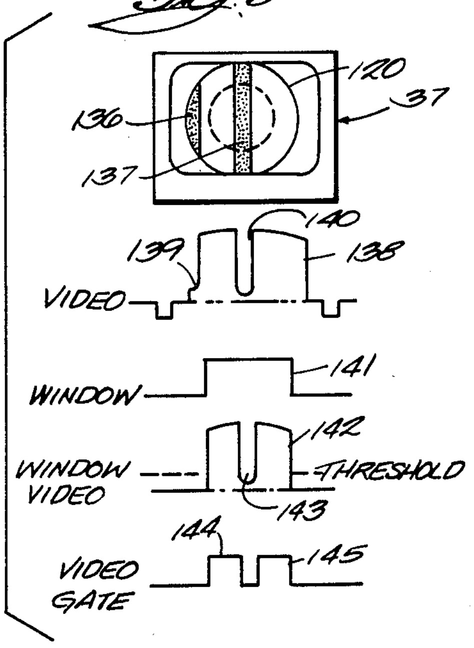

X-RAY IMAGE BRIGHTNESS CONTROL

BACKGROUND OF THE INVENTION

This invention relates to fluoroscopic X-ray apparatus and, in particular, to a method and means for maintaining the brightness of a displayed X-ray image constant.

In present day fluoroscopic apparatus, the beam from an X-ray tube is projected through the body and the emergent X-ray image is incident on the input phosphor of an X-ray image intensifier. The intensifier converts the X-ray image to a bright minified optical image which is received by a video camera that effects display of the image on the screen of a video monitor. During examination procedures, the X-ray beam field is usually defined with orthogonally movable pairs of collimator blades or shutters. Usually, when the X-ray tube is energized and the image first appears on the screen it will be necessary to resort to remote controlled adjustment of the collimator blades so that little more than the particular anatomical region-of-interest is exposed to the X-ray beam. This is necessary to minimize X-ray dosage to the patient and is especially important in fluoroscopic examinations which are usually of substantial duration.

It is beneficial to the diagnostician if the displayed X-ray image is held at constant average brightness or intensity during a fluoroscopic examination. It is also desirable to provide for permitting selection of the brightness level that is most comfortable to view and that maximizes the possibility of accurate diagnosis. Hence, an automatic brightness control (ABC) device is customarily provided in the fluorograph systems. Its intended purpose is to maintain average image brightness and account for all variables in the system that might affect brightness.

One ABC method involves detecting the average level of the output signal from the video camera. According to this method, the video signal is integrated by suitable circuitry and the result is compared to a stable reference signal. The error signal resulting from the comparison is then used to drive the X-ray tube current regulator to increase or decrease the intensity of the radiation emitted by the tube until the error signal is nulled. If the X-ray field of view is fixed, it is possible in such system to calibrate the integrator to obtain a preferred brightness level. If the X-ray field is changing, as when the shutters are moved across the beam, the integral of the video signal will be erroneous. To compensate for the error, it has been customary to develop a feedback signal indicative of the shutter or collimator blade opening area. Then, by dividing the integrated brightness signal by the shutter opening area signal, a signal representative of the brightness per unit area was developed for regulating the X-ray tube current. An undesirable feature of total image brightness averaging is that image contrast becomes distorted. Any error in the calculation of the shutter opening area also produces errors in the compensation function. Ordinary image intensity averaging also leads to excessive brightness when an object such as a part of a heavily X-ray attenuating lead glove worn by the radiologist gets into the image field. In addition, X-ray collimator systems usually have straight blades that define X-ray fields that are square in cross-section at all levels along the diverging X-ray beam and this square field or image is incident on an image intensifier input phosphor that is circular. The shutters on the video camera are also usually circular so the image displayed on the video monitor screen is circular. Thus, for example, if the heart is the primary region of interest, it will appear in the circular field but there might be more or less penetrable lung tissue or bone appearing in the field around the heart. Shutter opening area compensation is, therefore, complicated by the different geometries.

Another method involves use of peak brightness detectors. In some images, extreme highlights or lowlights occur which desirably should not be factored into determining the average image brightness. Images were often too dark in the region-of-interest because of the peak detector poor response to highlights.

SUMMARY OF THE INVENTION

Objects of the present invention are to provide a collimator opening area compensation method which requires no position information from the collimating devices.

Another object is to obtain automatic and accurate area compensated brightness control regardless of the shape of the collimator shutters.

Still another object is to account for and eliminate from the brightness calculation the effect of irregularly shaped objects such as a lead entraining glove that block out radiation in the field of view.

Briefly stated, in accordance with the invention, the area compensation function is accomplished by detecting the presence of the video signal above a threshold level which is set at a voltage corresponding to black level in the video image. A selected fixed voltage is then integrated only over the image areas where the body tissue appears which is where there is no impenetrable object and where the video signal is above the threshold level. The integrated result represents the time and area when the signal above threshold is present. Area corresponds to time because the video camera target and the monitor screen are scanned at a constant rate as is typical of a raster scan. Then by dividing the integrated value obtained only where there is video signal or actual image information into the integrated total video signal, the compensated brightness signal is obtained. In other words, the area in which there is a video signal above threshold level does not have to be constant nor continuous. The unique advantage of this type of area compensation is that the shape of the area is of no consequence. Any object including collimator blades or gloves which attenuate the video signal can be detected and compensated. This eliminates the errors due to misalignment of collimator systems and it also overcomes the variations in detector area geometry versus collimator geometry. With this technique, introduction of a lead glove or other high X-ray attenuator into the beam has little or no effect on the brightness of the remaining image.

A more detailed description of the new area compensating method and means for performing the same will now be set forth in reference to the accompanying drawings.

DESCRIPTION OF THE DRAWINGS

FIG. 4 is a timing diagram for explaining operation of the average detector; and FIGS. 5 and 6 show how the integrated brightness signal is developed for two different images that are displayed on a video monitor screen.

DESCRIPTION OF THE PREFERRED EMBODIMENT

Figure 1:
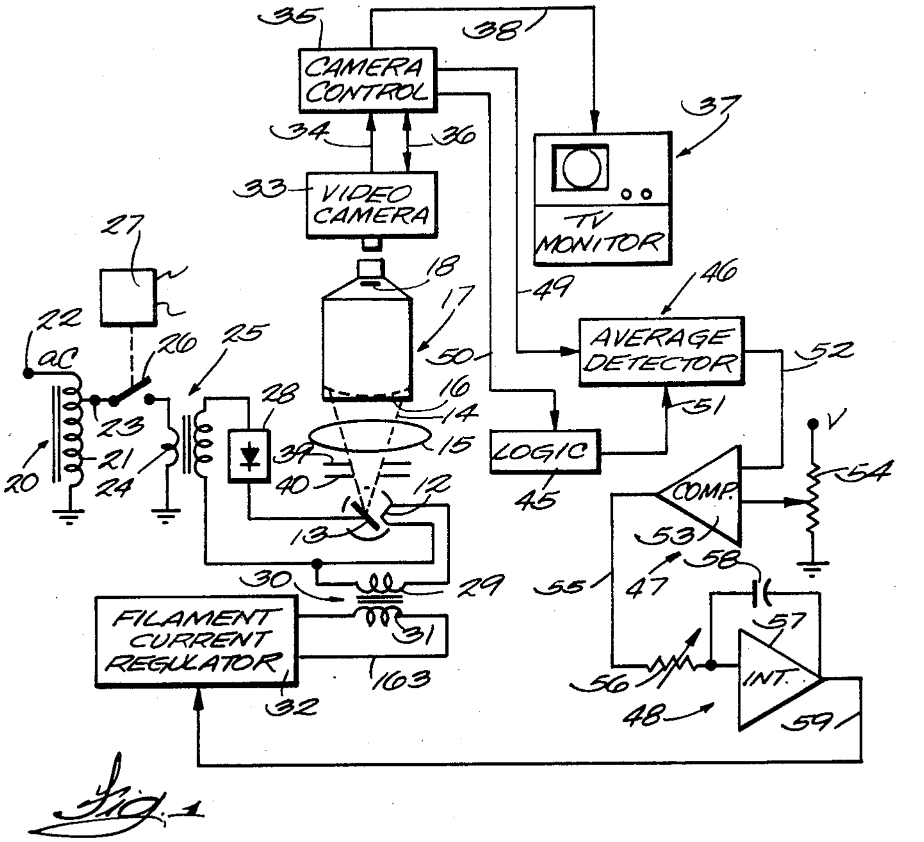
FIG. 1 is a block diagram of a typical fluorography system in which the new compensated image brightness control is installed.

An X-ray fluorography system in which the new image area compensated brightness control can be used is depicted in FIG. 1. The X-ray tube is designated generally by the numeral 10. It comprises an anode 11 and a heated filament or cathode 12. The focal spot at which the electron beam from the cathode impinges to cause X-ray emission is marked 13. The defined boundaries of the divergent X-ray beam are shown in dashed lines marked 14. The X-ray beam is projected through a body that is represented by the ellipse 15. The emergent X-ray image impinges on the input phosphor 16 of an X-ray image intensifier that is generally designated by the numeral 17. As is well known, the image intensifier converts the X-ray image to a corresponding modulated electron beam which is focused on the output phosphor 18 of the intensifier. Thus a bright and minified optical image corresponding to the X-ray image is presented on output phosphor 18.

A rudimentary X-ray power supply is shown in FIG. 1. It comprises an autotransformer 20 having a winding 21 that is supplied with building power line input voltage at input terminal 22. A slider or tap changer 23 is movable along winding 21 to provide an ac output voltage of a selected value. This voltage is applied to the primary winding 24 of a high voltage stepup transformer 25 by closing relay contact 26 under the influence of a relay 27 which is energized to operate switch 26 in response to the user commanding initiation of an X-ray exposure interval.

The high secondary voltage from transformer 25 is rectified in a rectifier 28 and the resulting dc voltage is applied between anode 11 and cathode or filament 12 of the X-ray tube. As is known, the higher the voltage the more energetic are the X-ray photons generated at the anode target 11 and the more penetrating power the X-ray beam has. The intensity of the X-ray beam or quantity of X-ray photons is governed by the amount of electron current flowing between the cathode and anode of the X-ray tube during an X-ray exposure while the high voltage is applied to the anode. Generally, the brightness of intensity of the X-ray image varies with X-ray tube current. X-ray tube current and, hence, emissivity of cathodic filament 12 depends on filament temperature which is related to the voltage applied to the filament and the current flowing through it. The filament is supplied from the secondary winding 29 of an isolation transformer 30. The voltage on the primary winding 31 and, hence, filament current is regulated by a filament current regulator circuit that is symbolized by the block marked 32. One type of regulator whose output voltage can be controlled by an analog input signal will be discussed later in reference to FIG. 2.

In FIG. 1 the optical image on output phosphor 18 is viewed by a video camera represented by the block marked 33. Video camera 33 converts the optical image into analog video signals in a basically conventional manner and these analog signals are fed by way of a line 34 to a camera control unit 35. The camera control controls the video camera by a suitable exchange of signals over multiple lines 36. The target of the video camera is read out by scanning it in a raster pattern in a conventional manner. For the purpose of illustrating the invention, it can be assumed that the video camera target is read out or scanned in the interlaced mode although progressive scanning is also compatible with the new area compensated image brightness control.

Camera control 35 inserts into the video signal the timing signals such as the vertical and horizontal sync and blanking pulses which are necessary for display of an optical version of the X-ray image on a TV or video monitor which is designated generally by the block marked 37. The composite analog video signals are supplied to the monitor by way of a line 38.

Conventionally, the divergence or cross-sectional size of the X-ray beam 14 is governed by the setting of X-ray impervious collimator blades which are interposed between the X-ray tube 10 and the body 15. Two pairs of beam defining collimator blades are identified by the reference numerals 39 and 40. These blades can be moved toward and away from each other to vary the field size of the X-ray beam. In an actual collimator, as is well known, there are another set of blades which are movable orthogonally to the pair which are shown so as to define the size of the beam in two dimensions. Usually the blades are adapted for defining an X-ray field that is square in the transverse dimension. Typically, the input phosphor 16 of the X-ray image intensifier tube 17 is circular and so is the output phosphor 18 so the image viewed by the video camera 33 is circular. These differences in geometrical configuration create one of the problems that the new area compensated automatic brightness control (ABC) described herein involves.

The collimator blades are usually positioned with a servomotor system, not shown, in response to the examinating radiologist operating a switch, not shown. The blades of the collimator are always adjusted during an examination to limit the X-ray beam field size so the beam only extends over the anatomical region-of-interest and no unnecessary dosage is delivered to the patient.

It is important for the sake of comfortable viewing and obtaining maximum diagnostic information from the image displayed on the video monitor 37 or the average brightness of the displayed image to be held constant. As indicated earlier, an automatic brightness control (ABC) system used heretofore integrated the analog video signals over each video field or frame and this integrated signal was compared with a reference signal so as to produce an error signal which could be used to adjust the filament current regulator to raise or lower the X-ray tube current over the fluorographic exposure interval to thereby maintain a predetermined average image brightness level. However, a basic system such as that can only determine brightness if it is calibrated for operating with a fixed X-ray beam geometry.

During a fluorographic examination, it is frequently necessary for the examining radiologist to put his or her hands in the X-ray to palpate a patient, for instance. Invariably, lead entraining gloves are worn by the examining radiologist. The X-ray impervious gloves shadow the X-ray beam and appear as an all white or all black area in the displayed image, depending on the polarity of the video signals. Prior art ABC systems sensed the dark area, for instance, in the image as a normal reduction in average image brightness and reacted by causing the X-ray tube current to be increased markedly to bring the average brightness of the image area up to the calibrated brightness level. This means that the image that was not shadowed by the X-ray protective glove became excessively bright and the corresponding loss in contrast in the image made it more difficult for the examining radiologist to elicit information from the image.

The new compensated ABC system that overcomes all of the problems just mentioned is shown in FIG. 1 to be comprised of several principal components including a combinational logic circuit represented by the block marked 45, an average detector circuit 46, a comparator circuit 47 and a gain control circuit 48. As indicated earlier, camera control 35 inserts the sync signals into the analog video signals for displaying the image on monitor 37. The raw video signal, that is, without the sync signals is applied through camera control 25 to average detector 46 by way of a line 49. The camera control also provides timing signals by way of multiple lines 50 to combinational logic block 45 which, in turn, provides control signals by way of multiple lines 51 to the average detector 46. Detector 46 will be described in greater detail in reference to FIG. 3 shortly hereinafter. The average detector 46 which is supplied by way of line 52 to one input of an amplifier connected as a comparator 53. The other input to comparator 53 is a reference signal derived from a selectable voltage source symbolized by the potentiometer 54. By adjusting potentiometer 54, a reference signal is provided that sets the average image brightness that the user would like to maintain. The output signal from comparator 53 is supplied by way of a line 55 through a variable resistor 56 to an input of an integrating amplifier 57 which allows for adjusting the gain applied to the error signal from the comparator 53. The integrating or smoothing capacitor in the gain control circuit is marked 58. The analog output signal from integrator and gain control circuit 48 is fed by way of a line 59 to the filament current regulator 32. As explained, the filament current regulator 32 responds to variations in the signal on line 59 by continuously adjusting filament current by varying the voltage applied to the primary winding of isolation transformer 30.

The basic functional features of the average detector include (1) a video gate which provides a selected area over which the video signal will be integrated, but the sampled area need not be continuous; (2) an integrator function to calculate the brightness amplitude integral; (3) an area calculating function; and (4) a ratio function to determine average signal per unit area.

Figure 3:
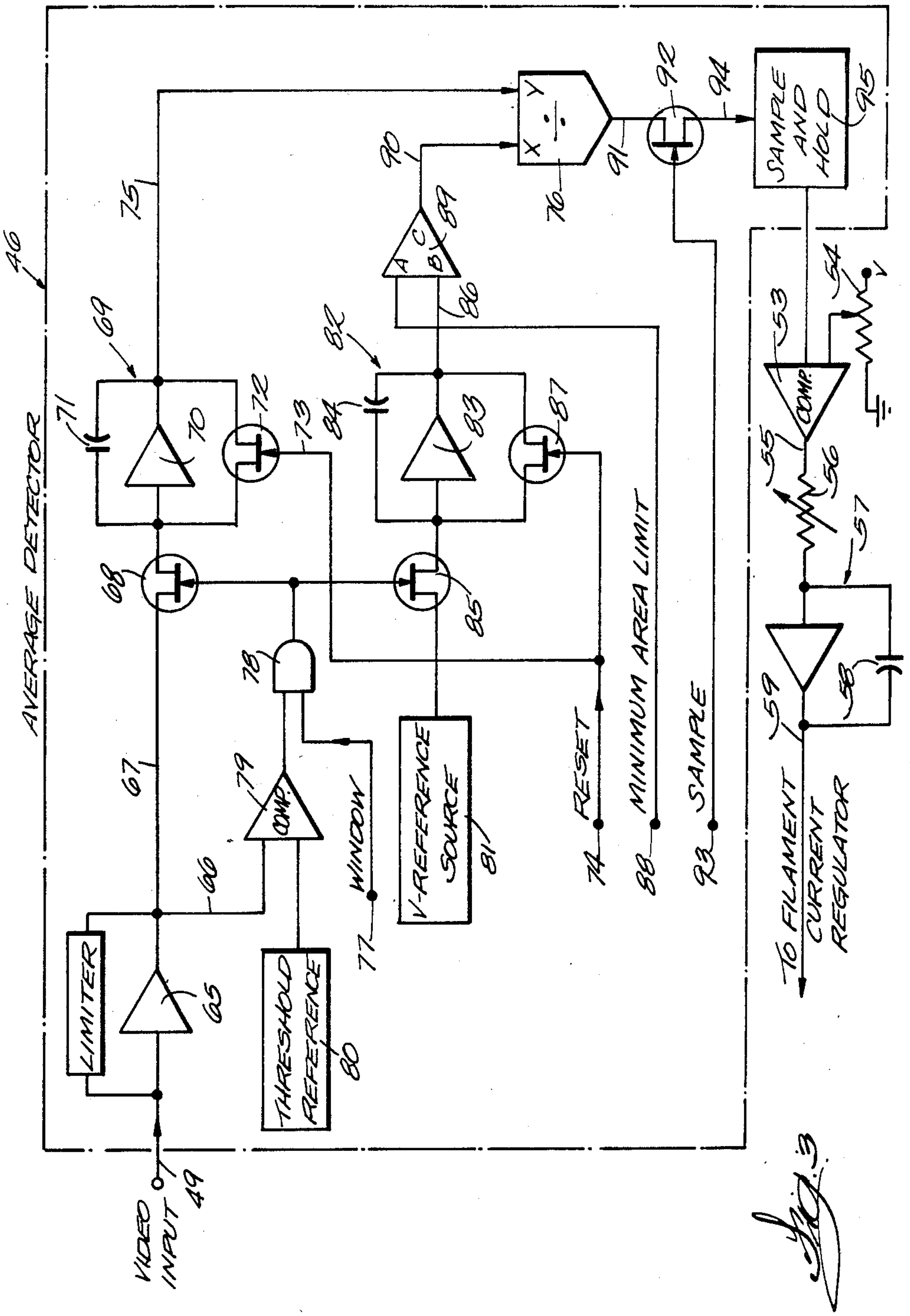
FIG. 3 is a more detailed diagram of the average detector shown in block form in FIG. 1 along with the control signal output circuit.

The new compensated average brightness detector 46 will now be described in detail in reference to FIG. 3. The video signal without sync pulses included is input to the detector 46 on line 49 as it was in FIG. 1. In FIG. 3, the video signal is passed through a buffer amplifier 65 which is connected as a limiter. The function of limiters is well known. In this particular case, the limiter cuts the highlights of highest peaks from the analog video signal which would go beyond the dynamic range of the display system. The video signal output from buffer amplifier 65 is provided to two circuits which begin with lines 66 and 67. There is a semiconductor switch in the form of a field effect transistor (FET) switch 68 which serves as a gate means for enabling gating the video signal to an integrating circuit 69 if two conditions are met simultaneously during a video field, if interlaced video scanning is used, or during a frame if progressive scanning is used. The integrating circuit is comprised of an operational amplifier 70 having an integrating capacitor 71 connected between its output and input terminals. There is another FET switch 72 connected across the terminals of capacitor 71. During an integrating cycle, this switch is non-conducting so that the video signal for an image field preferably can be integrated when the conditions are met. The conditions are (1) the video signal must be above a brightness threshold level, and (2) a window signal must exist concurrently. At all times that the window signal does not exist, a reset signal is applied to the control gate of FET 72 which maintains FET 72 conductive so as to keep the voltage on integrating capacitor 71 at zero level. In other words, at all times that the video signal coming in on line 67 is not being sampled, the voltage signal on integrating capacitor 71 is held at zero. Reset signals for FET 72 which cause the FET to discharge capacitor 71 are provided through terminal 74 in FIG. 3 from logic circuit 45 that is depicted in FIG. 1.

The window signal is also provided from logic circuit 45 to average detector 46 through terminal 77. A window signal is generated for each horizontal scan line and these signals may vary in duration since their purpose is to define the length along a horizontal scan line in which image brightness can be sampled. Taken together the window signals define the boundaries of the region in an image field wherein brightness or video signal level may be sensed. The window signal is one input to an AND gate 78. When the output of AND gate 78 switches to a high logic level, in this example, as is the case when both of its inputs are high, the video gate FET 68 is rendered conductive and integration begins. Besides requiring the window signal to exist before the output and AND gate goes high, another high logical level signal must be supplied to the other input of AND gate 78 from the output of a comparator 79 for the output to go high. The video signal is one input to comparator 79 by way of line 66. The other input to comparator 79 is a threshold reference signal. This signal is generated in the circuit block labeled threshold reference and is further identified by the numeral 80. The threshold reference signal generator is a conventional circuit for generating a stable but adjustable level signal. The threshold reference signal generator is adjusted so that comparator 79 will switch to a high logical output state at all times that the incoming video signal on line 66 is above threshold reference signal level. The reference signal is set to the lowest gray level that it is desired to detect as image. All video signal that is below the threshold level is considered black and is not counted. In any event, whenever the output of comparator 79 is in a high state and the window signal is present, the output of AND gate 78 goes high and turns on the video gate switch 68 so that integration of the video signal progresses. The integrated signal represents the average brightness of all zones in the image that are above threshold and have been scanned within the window.

What happens can be further clarified by reference to the FIG. 4 timing diagrams. The uppermost waveform shows the video signal on lines 66 and 67 for one vertical video or television field in this example. The threshold reference signal level is indicated by the dashed line marked 180. As can be seen in the third timing waveform from the top in FIG. 4, the threshold comparator 79 output switches to a high state whenever the video signal shown in the top or uppermost waveform is above threshold level. In this particular case, the window signal represented by the second waveform from the top in FIG. 4 is high only when the horizontal sweep for the video camera target and video monitor is within a circle in this case as will be described further later. In FIG. 4, one may see that when the threshold comparator 79 output goes high and there is concurrent existence of the window signal, the control signal to the video gate FET goes high and integration by integrator 70 takes place.

Referring again to FIG. 3 a dc reference signal source 81 is provided. This fixed level reference signal is the input signal to a second integrating circuit 82 which is used to determine the area in the image in which the first integrator 69 averages the video signal for determining brightness. Circuit 82 comprises an operational amplifier 83 and an integrating capacitor 84. During the time that the other or first integrating circuit 69 is integrating video signal above threshold reference level and within the window, integrator 82 is integrating the dc reference signal from source 81. This reference signal is calibrated so as to allow the integration to maximize if the whole image field were subject to brightness detection. To provide for determining the area wherein the aforementioned two conditions are met, there is another FET switch 85 in the circuit between the reference signal source 81 and integrating circuit 82. Because the control gate of FET switch 85 is also connected to the output of AND gate 78, both FET switches 68 and 85 become conductive at the same time. The output signal from area integrator 82 appearing on line 86 represents the time that the video signal is being integrated by the other integrator 69. Since the video system is a raster scan system wherein the scanning beam in the video camera and display monitor are sweeping in synchronism and at a constant rate, the output signal from integrator 82 on line 86 corresponds to the area in the image over which integration has taken place as well as the time during which video signal integration occurs. There is a FET switch 87 whose load circuit is connected across integrating capacitor 84. This FET switch is rendered conductive for the purpose of discharging integrating capacitor 84 with a reset control signal applied to its control gate. This is the same signal that resets FET 72 to a conductive state.

The signal on line 86 that corresponds to image area where the video signal is above threshold and the window exists is one input to a limiter or clamping circuit 89. This circuit puts a limit on how small an image the system will compensate for. This is necessary because a division will be performed in divider 76 and it should be evident that it would be erroneous to divide by a signal that is at or near zero. The area indicative signal on line 86 is supplied to a terminal marked B limited circuit 89 and a signal representative of the minimum area limit is fed in from logic circuit 45 through a terminal applied to the other input of amplifier 89 marked A. The limiter output is marked C. The signal on output C is equal to B for situations where the area signal to input B is greater than the minimum area limit signal fed to input A. For situations where the area signal to input B is less than or equal to the minimum area limit signal to input A, the output C is equal to A. Thus, output C is never less than input A.

The signal on output C of amplifier 89 that corresponds to the area in which the video signal is integrated by integrator 69 is fed by way of line 90 to an input marked X on divider 76. The signal fed by way of line 75 to the input of the divider marked Y corresponds to the total brightness of the integrated part of the image. Thus, the area signal to input X divided by the sum or integrated brightness Y of the same area yields an analog signal representative of the average brightness per unit of integrated image area and this analog signal is provided on the output line 91 from divider 76.

At the end of each video field in this example, the signal representative of brightness per unit area is sampled by rendering a FET switch 92 conductive. The control signal to the gate of FET switch 92 for turning it on to take a sample, is supplied through a terminal 93 which connects to logic circuit 45 where the signal is developed.

The sampled signal representative of brightness per unit area in the image is conducted by way of line 94 to a conventional sample and hold circuit which is represented by the block marked 95. This circuit is the output stage of the average detector circuit 46. The average brightness per unit area signal is held in this stage for the duration of a video field time although it could be held for two fields constituting a video frame time as well. In any event, the signal from the sample and hold circuit 95 is provided to the comparator 53 which was previously discussed in reference to FIG. 1 and which provides a reference signal that allows setting the average image brightness to that which the user would like to maintain. The output signal from comparator 53 is then supplied through variable resistor 56 and the integrating and gain control circuit 57 to the filament current regulator 32 as indicated in FIG. 1.

Figure 2:
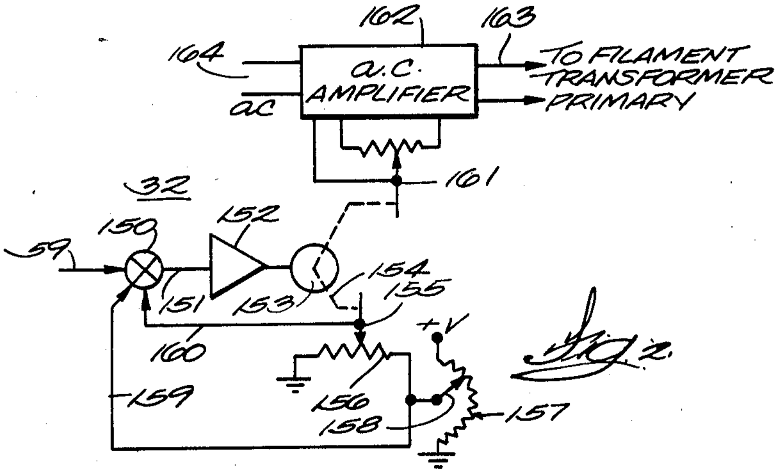
FIG. 2 is an example of an X-ray tube current regulator that is subject to regulation with the new brightness control.

A typical filament current regulator that could be used will be described later in reference to FIG. 2.

The FIG. 4 timing diagram should be referred to for further clarification of events that take place in the average detector 46. The fifth timing waveform below the uppermost one in FIG. 4 shows how the brightness integral signal changes with the times during which there is a window signal and at the same times threshold comparator signal is above the threshold level. The solid line in this brightness versus vertical field time signal shows how the video signal is integrated by integrator 69 during the interval that ends after the window ends as indicated at the signal level marked 110. The dashed line 111 illustrates how the brightness integral would increase if the brightness of the entire image area were integrated. The sixth timing waveform from the top video signal waveform in FIG. 4 shows how the integral representative of the area in which the video signal was above threshold and in the window varies correspondingly with the brightness integral. The second from the bottom timing in FIG. 4 shows how the sample signal that is fed through FET 92 is caused to occur after the window range has been passed after scanning a vertical field. The lowermost timing waveform in FIG. 4 shows how reset takes place as soon as the sample of the signal that maintains average brightness per unit of image area constant.

Some examples of actual system operating conditions will now be given in reference to FIGS. 5 and 6. Consider FIG. 5 first. An image field is being displayed on the screen of video monitor 37. The outer circle 120 is the boundary of the entire image that would appear on the circular output phosphor 18 of the image intensifier tube. Assume that collimator blades are being adjusted across an image field. A part of the image field that is being shaded by the collimator blades is cross hatched in FIG. 5 and indicated by the numerals 123 and 124. The bright vertical area is the part of an image that can be visualized on the video monitor screen. This is marked 125. The dashed line circled 126 is the sensed area. It is the average brightness per unit of area in the visible image region 125 that is to be determined by the compensated average detector 46 and used to adjust the filament regulator so that brightness in the visible image area 125 will be maintained constant with a given and other adjusted positions of the collimator blades. In FIG. 5 the entire video signal for one horizontal scan line is represented by the waveform 127. The video signal is, of course, low where the collimator blades blank out the image as indicated by the low signal values in the leftmost and rightmost parts of waveform 127 corresponds to the shaded regions 123 and 124. The two horizontal blanking pulses 128 and 129 are for just one typical horizontal scan line. The window duration that is input to terminal 79 in FIG. 3 for the typical horizontal scan line is indicated by the waveform 130. As explained earlier, if the video signal is above the threshold reference signal set by reference signal source 80 and the window exists at the same time in any horizontal scan line, integration of the video signal by integrator 69 occurs on that scan line. The signal on capacitor 84 of integrator 82 at the end of a video field is the accumulation of the signals integrated on the horizontal line. In FIG. 5, the video signal that is within the window is represented by the waveform 131. As can be seen, the window starts at 132 and terminates at 133 in the typical line. However, some of this image is below threshold reference set by element 80 in FIG. 3 and the threshold reference level is indicated with a dashed line 134 in FIG. 5. It is only the region that is both above threshold and within the window that is integrated by capacitor 84 to determine the area of interest within each video field. Thus, the cumulative integrated signal on capacitor 84 is represented by the waveform 135 indicated as the video gate control signal in FIG. 5. The video gate control signal enables both the average brightness integrator 69 and the area integrator 82 to integrate during the same time in those horizontal lines where the video signal is above threshold and the window exists. It should be evident that it does not make any difference how the collimator blades are set since the total video signal integrated on capacitor 71 is divided by an automatically determined area over which integration takes place so that a signal corresponding to brightness per unit area is obtained for controlling the X-ray tube current which governs the image brightness.

In the FIG. 6 example, another image is displayed on the screen above the video monitor 37. The full image produced would be bounded by the circle 120 again. In this case, assume that no collimator blades are cutting off any part of the X-ray beam. The image would still be circular since the phosphors 16 and 18 of the image intensifier are circular. Assume that the region 136 is a low light or dark region such as might be caused by the projected image of a bone and is below threshold brightness level. The shaded band 137 in the center is due to an object that attenuates a part of the image beam such as a radiologist's X-ray impervious glove that has entered the X-ray beam field. The entire video signal for a typical video horizontal line is represented by the waveform 138. The video signal is low in regions 139 and 140 because of the heavy attenuation of the X-ray beam by the more or less impervious areas 136 and 137. The window is represented by the waveform 141. The video signal waveform that is within the window is marked 142. As can be seen from inspection of waveform 142, sometimes the video signal that is within the window is above the threshold reference and at other times such as over the interval 143 the video signal is below threshold. Again, the video signal is integrated on capacitor 71 only when the signal is above threshold and within the window. These conditions are met at two different times in FIG. 6. At these times which are marked 144 and 145 the output of AND gate 78 goes high since there is a window in existence and the signal is above threshold reference. At these times the video gates or switches 68 and 85 become conductive to provide a total integrated signal on capacitor 71 for a video field representative of the average image brightness and another signal integrated on capacitor 84 that represents the area over which the signal was integrated. Thus, a final signal is developed by dividing these two signals in divider 76 and a signal corresponding to the resulting quotient is used to regulate the X-ray tube current to maintain image brightness at whatever level the user has determined by setting the poteniometer 54 associated with comparitor 53. From the foregoing description one may see that anomalous attenuation of the X-ray beam such as might be caused by the lead glove of a radiologist entering the X-ray beam is completely eliminated from the brightness computation.

As indicated, any filament current regulator 32 that is subject to regulation by variations of an input control signal may be used to regulate X-ray tube filament current. A regulator with suitable properties is depicted in FIG. 2. The control signal to the filament current regulator in FIG. 2 is delivered over the line 59 as it is in FIG. 1. In FIG. 2, the control signal on line 59 is one input to a summer 150 whose output line 151 feeds a servo system amplifier 152. The output of amplifier 152 is the drive signal for a servomotor 153. As symbolized by the dashed line 154, servomotor drives the wiper 155 of a potentiometer 156. A potentiometer resistor is tied to a reference voltage source such as potentiometer 157. Setting of potentiometer 157 sets the filament current for producing the X-ray tube current at which fluorography is desired. The reference signal taken off of the wiper 158 of potentiometer 157 constitutes one input, by way of line 159 to summer 150. Another input 160 of the summer is a voltage derived from wiper 155. If the approximate desired X-ray tube current is set by adjusting wiper 158 of potentiometer 157, there will first be an error signal constituting the difference between the voltages on wipers 155 and 158 and, hence, the voltage difference between the inputs 159 and 160 of summer 150. This error signal is amplified and used to energize the servomotor to run until wiper 155 is moved to a position where the error signal is reduced to zero and the servomotor stops. Now the compensated control signal on line 159 is another input to summer 150. This signal creates unbalance or error signal in the output line 151 of the summer and servomotor 153 drives until the error signal is nulled by the opposite signal developed on driven potentiometer wiper 95. Servomotor 153 also drives the potentiometer wiper 161 which regulates the output voltage from an ac amplifier circuit represented by the block marked 162. The output lines 163 are connected to the primarily winding of the filament transformer 31 as in FIG. 1. The ac power input lines to amplifier 162 are marked 164. The filament can be energized when the X-ray system is initialized for making a fluorographic exposure but no X-rays are emitted until the high voltage is applied to the X-ray tube anode 11 by closing switch 26.

I claim:

1. A method of regulating the brightness level of an optical image that corresponds to an X-ray image, produced with the beam of an X-ray tube, said method comprising the steps of:

generating analog video signals representative of said optical image and using said signals to drive a raster scanned video monitor to display said image, integrating the video signals for each horizontal video line only during the times that the video signals are greater in magnitude than a threshold reference signal and there is coexistence with window signals that define the integration length along each horizontal scan line, concurrently with integrating said video signals, integrating a voltage signal whose integrated value is a function of time, and since the scan rate is constant over each video field said value corresponds to the area over which said video signal is integrated, dividing the integrated signal value representative of average image brightness by the integrated signal value corresponding to area such that the resulting signal is representative of brightness per unit area, comparing said resulting signal with a reference signal representative of the image brightness desired, and using the error signal resulting from the comparison to control an X-ray tube current regulator to adjust the tube current and thereby change the image brightness by an amount that reduces the error signal to zero.

2. In a fluorographic system including an X-ray tube having an anode and a filament, a regulator coupled to said filament and responsive to the magnitude of a control signal by controlling the current flowing through the filament correspondingly to thereby regulate the current flowing between the anode and cathode of the tube, means for converting an X-ray image produced with the X-ray beam from the tube to an optical image, a video camera for converting said optical image to analog video signals, a raster scanned video monitor responding to said video signals by displaying the image, and an improved system for controlling the brightness of the image, comprising:

first integrating means which, when enabled, integrates said analog video signal for a selected one of a video field or a frame, means for producing a threshold reference signal, comparator means having input means for said analog video signal and for said threshold reference signal, said comparator means producing an output signal whenever the magnitude of said analog video signal is greater than that of said reference signal, means for providing successive window signals having durations corresponding to distances along the horizontal scan lines to thereby define the field in the image in which average brightness is to be determined, means responsive to concurrent existence of said window signals and said comparator output signals by producing corresponding integrator enabling signals, a dc reference signal source, a second integrating means responsive to occurrence of said integrator enabling signals by integrating said dc reference signal to thereby produce an output signal corresponding to the time during which said video signal integrated by said first integrator means is above the threshold reference and within the window, and since the video horizontal scan rate is constant, said time corresponding to the area in which the video signal is integrated by said first integrator means, means for dividing the first integrator output signal by the second integrator output signal at the end of each of said selected one of said video fields or frame to produce a resulting signal representative of image brightness per unit of image area whose video signal was integrated, means for producing another reference signal corresponding to desired image brightness, means for developing a control signal corresponding to the difference between said resulting signal and said last named reference signal, and means for coupling said control signal to said X-ray tube current regulator.

3. In a fluorographic system including an X-ray tube having an anode and a filament, a regulator coupled to said filament and responsive to the magnitude of a control signal by controlling the current flowing through the filament correspondingly to thereby regulate the current flowing between the anode and cathode of the tube, means for converting an X-ray image produced with the X-ray beam from the tube to an optical image, a video camera for converting said optical image to analog video signals, a raster scanned video monitor resonding to said video signals by displaying the image, and an improved system for controlling the brightness of the image, comprising:

first integrating means having an input for said video signals and operative to integrate said signals selectively, first switch means for controlling input of said signals to said integrating means, a threshold reference signal source, means operative to produce an output signal while the magnitude of said video signal along a horizontal scan line is greater than the magnitude of said threshold reference signal, means operative to produce a window signal during each horizontal scan line having a predetermined duration for defining the area in the image in which brightness is to be sensed, means responding to concurrent existence of said window signal and said output signal by producing a gating signal that controls said first switch means to apply the video signal to said input of the first integrating means, a second integrating means having signal input means, a source of a reference voltage signal, second switch means responding to occurrence of said gating signal by applying said reference voltage signal to said input of the second integrating means for said second integrating means to integrate an area signal corresponding to the image area over which said video signal is integrated by said first integrating means, means for dividing the signal corresponding to average brightness of the image integrated with said first integrating means to produce a resulting signal representative of the average brightness per unit area of the part of the image where the video signal was greater than the said threshold reference and within the window, means for comparing the signal resulting from said dividing with a reference signal that is adjustable to determine the image brightness desired, means for coupling the signal corresponding to the error between said resulting signal and said last named reference signal to said X-ray tube current regulator to effect reducing the error signal, and means for resetting said integrators after the selected video signal in a field is integrated.

4. The brightness control system according to claim 3 including a limiter circuit having input means for said video signal from said video camera and having output means coupled respectively to said means operative to produce an output signal while said video signal is greater than said threshold reference and to said first switch means, said limiter circuit operating to limit the magnitude of said video signals such that video signals representative of highlights in the image field are not integrated and are excluded from determining average brightness.

* * * * *